United States Patent
Zhu et al.

(10) Patent No.: US 11,537,967 B2
(45) Date of Patent: Dec. 27, 2022

(54) METHOD FOR PROCESSING ITEM SORTING SCHEDULING REQUEST, AND RELATED DEVICE

(71) Applicant: CAINIAO SMART LOGISTICS HOLDING LIMITED, Grand Cayman (KY)

(72) Inventors: Lijun Zhu, Hangzhou (CN); Shenghuo Zhu, Hangzhou (CN); Sen Yang, Hangzhou (CN); Ruipeng Luan, Hangzhou (CN); Heng Liu, Hangzhou (CN); Kailiang Tong, Hangzhou (CN); Yuanhong Xu, Hangzhou (CN)

(73) Assignee: CAINIAO SMART LOGISTICS HOLDING LIMITED, George Town (KY)

( * ) Notice: Subject to any disclaimer, the term of this patent is extended or adjusted under 35 U.S.C. 154(b) by 226 days.

(21) Appl. No.: 16/880,462

(22) Filed: May 21, 2020

(65) Prior Publication Data
US 2020/0279204 A1    Sep. 3, 2020

Related U.S. Application Data

(63) Continuation of application No. PCT/CN2018/115346, filed on Nov. 14, 2018.

(30) Foreign Application Priority Data

Nov. 23, 2017   (CN) .......................... 201711178697.1

(51) Int. Cl.
*G06Q 10/06* (2012.01)
*G06F 16/23* (2019.01)
(Continued)

(52) U.S. Cl.
CPC ... *G06Q 10/06316* (2013.01); *G06F 16/2379* (2019.01); *G06Q 10/06312* (2013.01);
(Continued)

(58) Field of Classification Search
CPC .......................... G06Q 10/06316; G06Q 50/28
See application file for complete search history.

(56) References Cited

U.S. PATENT DOCUMENTS 8,396,585 B2   3/2013   Antony et al.
8,456,123 B2   6/2013   Nishiuchi et al.
(Continued)

FOREIGN PATENT DOCUMENTS

CN   103399543 A   11/2013
CN   104392340 A   3/2015
(Continued)

OTHER PUBLICATIONS

Extended European Search Report dated Aug. 10, 2020, issued in related European Application No. 18882204.3 (8 pages).
(Continued)

*Primary Examiner* — A. Hunter Wilder (57) ABSTRACT

Methods, devices, and apparatus, including computer programs encoded on computer storage media, for processing an item-picking dispatching request are provided. One of methods includes receiving a dispatching request with respect to item picking; determining a type of the dispatching request; determining, in stored picking resource status information, target picking resource status information corresponding to the type of the dispatching request according to a preset correspondence between types of dispatching requests and picking resource status information, wherein the stored picking resource status information is updated in real time; generating mirror-image information of the target picking resource status information; and generating a dis-
(Continued)

After receiving a dispatching request with respect to item picking, determine target picking resource status information corresponding to the dispatching request — S101

Generate mirror-image information of the target picking resource status information — S102

Generate a dispatching task for item picking based on the mirror-image information of the target picking resource status information — S103 patching task for item picking based on the mirror-image information of the target picking resource status information.

17 Claims, 5 Drawing Sheets (51) Int. Cl.
*G06Q 50/28* (2012.01)
*G06Q 10/08* (2012.01)

(52) U.S. Cl.
CPC ... *G06Q 10/063114* (2013.01); *G06Q 10/087* (2013.01); *G06Q 50/28* (2013.01); *G06Q 10/06* (2013.01)

(56) References Cited

U.S. PATENT DOCUMENTS

| | | | |
|---|---|---|---|
| 8,825,682 | B2 | 9/2014 | Kishi et al. |
| 9,734,367 | B1 | 8/2017 | Lecky et al. |
| 2008/0065268 | A1 | 3/2008 | Wang et al. |
| 2008/0077511 | A1 | 3/2008 | Zimmerman |
| 2009/0099898 | A1* | 4/2009 | Ehrman ............ G06Q 10/06 705/7.15 |
| 2011/0055172 | A1* | 3/2011 | Tan ............ G06F 16/24568 707/769 |
| 2012/0029683 | A1 | 2/2012 | Keller et al. |
| 2014/0156472 | A1 | 6/2014 | Stuntebeck et al. |
| 2014/0277677 | A1 | 9/2014 | Ito |
| 2015/0032252 | A1 | 1/2015 | Galluzzo et al. |
| 2015/0073589 | A1 | 3/2015 | Khodl et al. |
| 2017/0100837 | A1 | 4/2017 | Zevenbergen et al. |
| 2017/0293959 | A1 | 10/2017 | Itou et al. |
| 2017/0308096 | A1 | 10/2017 | Nusser et al. |
| 2018/0043547 | A1 | 2/2018 | Hance et al. |
| 2018/0053275 | A1 | 2/2018 | Jones et al. |
| 2018/0108120 | A1 | 4/2018 | Venable et al. |
| 2020/0087068 | A1 | 3/2020 | Hance et al. |

FOREIGN PATENT DOCUMENTS

| | | |
|---|---|---|
| CN | 106371889 A | 2/2017 |
| CN | 106960301 A | 7/2017 |
| CN | 107222531 A | 9/2017 |
| JP | 2010-502535 A | 1/2010 |
| JP | 2010-099764 A | 5/2010 |
| JP | 2012-056132 A | 3/2012 |
| JP | 2013-115118 A | 6/2013 |
| JP | 2014-026662 A | 2/2014 |
| WO | 02-21399 A1 | 3/2002 |
| WO | 02-31724 A1 | 4/2002 |

OTHER PUBLICATIONS

PCT International Search Report and the Written Opinion dated Feb. 2, 2019, issued in related International Application No. PCT/CN2018/115346, with partial English translation (9 pages).

PCT International Preliminary Report on Patentability dated Jun. 4, 2020, issued in related International Application No. PCT/CN2018/115346, with English translation (9 pages).

Notice of Reasons for Refusal dated Jul. 13, 2021, issued in related Japanese Application No. 2020-528264, with English machine translation (11 pages).

First Search for Chinese Application No. 201711178697.1 dated Oct. 27, 2022.

* cited by examiner

METHOD FOR PROCESSING ITEM SORTING SCHEDULING REQUEST, AND RELATED DEVICE

CROSS-REFERENCE TO RELATED APPLICATIONS

The present application is a continuation application of International Patent Application No. PCT/CN2018/115346, filed on Nov. 14, 2018 with the China National Intellectual Property Administration, which is based on and claims priority to the Chinese Patent Application No. 201711178697.1, filed on Nov. 23, 2017 and entitled "METHOD FOR PROCESSING ITEM SORTING SCHEDULING REQUEST, AND RELATED DEVICE." The above-referenced applications are incorporated herein by reference in their entirety.

TECHNICAL FIELD

The present application relates to the field of logistics technologies, and in particular, to a method for processing an item-picking dispatching request and a related device.

BACKGROUND

Generally, in an item storage space such as a warehouse, a plurality of item picking areas are disposed, and different types of items are stored in different item picking areas in the item storage space. For example, three picking areas are disposed in the warehouse. A picking area A stores foods, a picking area B stores drinks, and a picking area C stores daily necessities.

Items are often picked from different picking areas. In order to improve efficiency of item picking, a drive apparatus such as a mobile robot and an item carrying apparatus such as a picking vehicle may be arranged in the item storage space. The mobile robot can provide a driving force for the item carrying apparatus to move from one picking area to another picking area. After arriving at a picking area, the item carrying apparatus can load items picked from the picking area.

In some embodiments, an item picking process may include: receiving a dispatching request, and generating a dispatching task according to status information of picking resources related to the dispatching request, for example, occupation states of a drive apparatus and a picking vehicle, etc. The status information of the picking resources is included in a context container. A context container may be a data structure or application for storing and managing status information or other data or objects. Each time of receiving a dispatching request, a dispatching system can generate a dispatching task based on the status information in the context container. However, the status information in the context container may be updated during the generation of the dispatching task. If the status information required for the dispatching request is updated, the processing of the dispatching request may be affected, and an error may occur in the processing of the dispatching request.

SUMMARY

In view of the above, the specification provides methods, devices, and apparatus, including computer programs encoded on computer storage media, for processing an item-picking dispatching request, to resolve the problem that an error occurs in processing of a dispatching request as a result of an update of status information related to the dispatching request in a context container.

According to a first aspect, the specification provides a method for processing an item-picking dispatching request, including: receiving a dispatching request with respect to item picking; determining a type of the dispatching request; determining, in stored picking resource status information, target picking resource status information corresponding to the type of the dispatching request according to a preset correspondence between types of dispatching requests and picking resource status information, wherein the stored picking resource status information is updated in real time; generating mirror-image information of the target picking resource status information; and generating a dispatching task for item picking based on the mirror-image information of the target picking resource status information.

In some embodiments, the method further comprises: obtaining an updated version of the target picking resource status information; determining whether the dispatching task conflicts with the updated version of the target picking resource status information; and in response to determining that the dispatching task conflicts with the updated version of the target picking resource status information, canceling the dispatching task.

In some embodiments, before determining, in stored picking resource status information, target picking resource status information corresponding to the type of the dispatching request according to a preset correspondence between types of dispatching requests and picking resource status information, the method further comprises: determining whether the dispatching request has an error; in response to determining that the dispatching request has an error, generating error information according to a type of the error, and returning the error information; and in response to determining that the dispatching request has no error, proceeding to the step of determining, in stored picking resource status information, target picking resource status information corresponding to the type of the dispatching request according to a preset correspondence between types of dispatching requests and picking resource status information.

In some embodiments, determining whether the dispatching request with respect to the item picking has an error comprises: determining whether the dispatching request conflicts with the target picking resource status information.

In some embodiments, the method further comprises: receiving picking resource status information; determining whether the received picking resource status information comprises erroneous status information; and in response to determining that the received picking resource status information comprises no erroneous status information, storing the received picking resource status information.

In some embodiments, the method further comprises: in response to determining the received picking resource status information comprises erroneous status information, marking the erroneous picking resource status information and recording content of the erroneous status information.

In some embodiments, determining whether the received picking resource status information comprises erroneous status information comprises: determining whether the received picking resource status information comprises two information entries with a correspondence; and in response to determining that the received picking resource status information does not comprise the two information entries with the correspondence, determining the received picking resource status information comprises erroneous status information.

In some embodiments, the received picking resource status information comprises status information from a drive apparatus, wherein the status information from the drive apparatus is of a uniform format; and the dispatching request comprises a dispatching request from the drive apparatus, wherein the dispatching request from the drive apparatus is of the uniform format.

In some embodiments, the method further comprises: updating the target picking resource status information based on the generated dispatching task.

According to a second aspect, the specification provides a device for processing an item-picking dispatching request, including: a communication interface configured to receive a dispatching request with respect to item picking; and one or more processors and one or more non-transitory computer-readable memories coupled to the one or more processors and configured with instructions executable by the one or more processors to perform operations comprising: receiving a dispatching request with respect to item picking; determining a type of the dispatching request; determining, in stored picking resource status information, target picking resource status information corresponding to the type of the dispatching request according to a preset correspondence between types of dispatching requests and picking resource status information, wherein the stored picking resource status information is updated in real time; generating mirror-image information of the target picking resource status information; and generating a dispatching task for item picking based on the mirror-image information of the target picking resource status information.

According to a third aspect, the specification provides an apparatus for processing an item-picking dispatching request, including: one or more processors and one or more non-transitory computer-readable memories coupled to the one or more processors and configured with instructions executable by the one or more processors to cause the apparatus to perform operations comprising: receiving a dispatching request with respect to item picking; determining a type of the dispatching request; determining, in stored picking resource status information, target picking resource status information corresponding to the type of the dispatching request according to a preset correspondence between types of dispatching requests and picking resource status information, wherein the stored picking resource status information is updated in real time; generating mirror-image information of the target picking resource status information; and generating a dispatching task for item picking based on the mirror-image information of the target picking resource status information.

The specification provides the method for processing an item-picking dispatching request. In the method, after the dispatching request is received, the picking resource status information corresponding to the dispatching request is determined and a mirror image of the picking resource status information is generated, and then the dispatching task is generated using the mirror image of the picking resource status information. In this way, even if the picking resource status information is updated, the mirror-image information of the picking resource status information is not affected, thereby avoiding an impact of the updated picking resource status information on the dispatching request.

BRIEF DESCRIPTION OF THE DRAWINGS

To describe the embodiments of the specification more clearly, the following briefly describes the accompanying drawings for describing the embodiments or the existing technologies. Apparently, the accompanying drawings in the following description show merely some embodiments of the specification, and a person of ordinary skill in the art may still derive other drawings from these accompanying drawings without creative efforts.

DETAILED DESCRIPTION OF THE INVENTION

The following clearly describes the embodiments of the specification with reference to the accompanying drawings. The described embodiments hereinafter are some embodiments of the application rather than all the embodiments. All other embodiments obtained by a person of ordinary skill in the art based on the embodiments of the specification without creative efforts shall fall within the protection scope of the application.

In an item storage space such as a warehouse, a plurality of item picking areas are disposed at different positions. Item picking refers to obtaining items from one or more storage areas and transporting the items to a designated area. In order to improve efficiency of item picking, a drive apparatus such as a mobile robot and an item carrying apparatus such as a picking vehicle may be arranged in the item storage space. The item carrying apparatus may be configured to carry items picked out from the picking area. The drive apparatus may be configured to provide a driving force for the item carrying apparatus, so that the item carrying apparatus can move to positions of all picking areas or other positions. In addition, in order to replenish the drive apparatus with energy, at least one energy pole, such as a charging pole, is further disposed in the item storage space. The drive apparatus moves to an energy pole to replenish itself with energy.

Various picking devices such as drive apparatus and item carrying apparatus may be deployed in the item storage space. In order to implement item picking, a dispatching task may be generated for picking devices and dispatching may be performed by the picking devices according to the picking task. Dispatching refers to assigning and controlling picking devices, and includes: controlling a drive apparatus to go to a position to drive an item carrying apparatus at the position and instructing the drive apparatus to arrive at the position from a current position; instructing the drive apparatus to replenish itself with energy at an energy pole at a position when the drive apparatus is out of power, and instructing the drive apparatus to arrive at the position from a current position; and instructing an item carrying apparatus to go to a number of picking areas to load items picked from the picking areas, etc.

The dispatching task may be generated based on status information of picking resources. The picking resources may include picking devices and a layout of an item storage space in which the picking devices works. The status information of the picking resources may include, but is not limited to the following: whether an item carrying apparatus is idle, a position of the item carrying apparatus, whether a drive apparatus is idle, a position of the drive apparatus, whether an energy replenishing apparatus is idle, a position of the energy replenishing apparatus, whether the drive apparatus is required to be charged due to low power, whether the item carrying apparatus is loaded, a layout map of an item storage space, etc. The layout map may include information of key positions. The key positions may include, but is not limited to positions of intersections, positions of picking areas, etc.

There are a plurality of types of dispatching for the picking devices. Different types of dispatching may require different status information, and all of the status information may be stored in a context container. However, after receiving the status information of the picking resources, a write process writes the status information to the context container, and therefore status information in the context container may be updated. If status information used for a dispatching request is changed during the processing of the dispatching request, an error may occur to the dispatching request.

Figure 1:
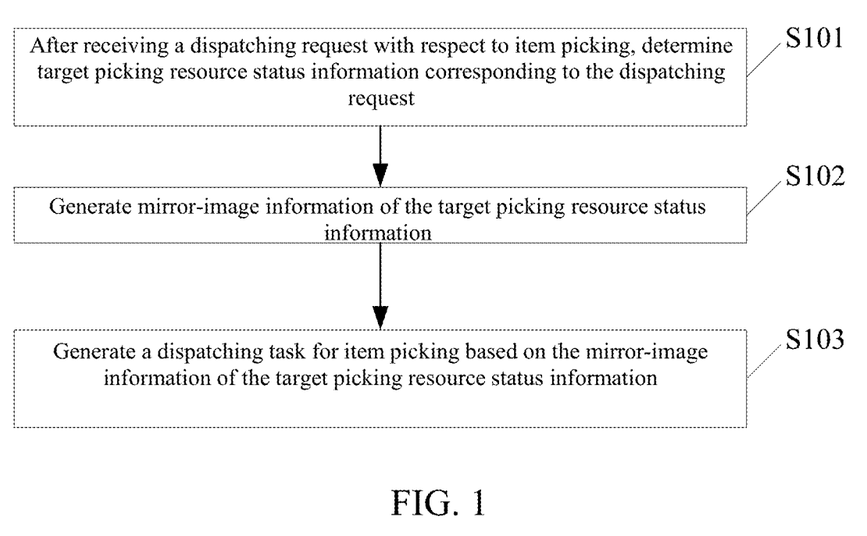
FIG. 1 is a flowchart of a method for processing an item-picking dispatching request, according to some embodiments of the specification.

Therefore, in order to avoid the problem, the specification provides a method for processing an item-picking dispatching request. As shown in FIG. 1, the method for processing an item-picking dispatching request includes steps S101 to S103.

S101: after receiving a dispatching request with respect to item picking, determining target picking resource status information corresponding to the dispatching request.

An apparatus executing the method may receive a dispatching request. The dispatching request may be sent by an external device, or may be generated inside a dispatching system. For example, a drive apparatus may send, to the apparatus executing the method, a dispatching request requesting for charging. In another example, the dispatching system includes the apparatus executing the method and a control device. The control device may determine, according to a monitored state of each picking device, that an item carrying apparatus can move from a position to another to load items, and then send a dispatching request to the apparatus executing the method.

After receiving the dispatching request, the apparatus executing the method may first determine status information of picking resources required for the dispatching request. For ease of description, the status information of the picking resources may be referred to as picking resource status information. The status information of picking resources required for the dispatching request may be referred to as target picking resource status information.

The picking resource status information may be stored in a storage container. In some embodiments, the picking resource status information is stored in a context container. Target picking resource status information corresponding to the dispatching request may be determined from the context container. In addition to the picking resource status information, the context container may further store configuration information, for example, a lower limit of energy for the drive apparatus in a working state and an upper limit of energy to be replenished during energy replenishing. The context container may further store dispatching tasks in a form of a file or a database. The context container may further record abnormal information and errors that occur during dispatching.

In some embodiments, in order to determine picking resource status information corresponding to each type of dispatching request, a correspondence between a type of dispatching request and required picking resource status information thereof may be preset. For example, if a type of dispatching request is to replenish the drive apparatus with energy, picking resource status information required for the type of dispatching request includes, but is not limited to: a position of the drive apparatus, positions of all energy replenishing apparatus, occupation states of all of the energy replenishing apparatus, a road layout of the item storage space, etc. In another example, a type of dispatching request is to drive the item carrying apparatus from a position to another. Thus, the picking resource status information required for the type of dispatching request may include, but is not limited to: a position of the item carrying apparatus, positions of all drive apparatus, occupation states of all of the drive apparatus, a road layout of item storage space, etc. In still another example, if a type of dispatching request is to assign a task of driving the item carrying apparatus to an idle drive apparatus, the picking resource status information required for the type of dispatching request includes, but is not limited to: picking task progresses of all item carrying apparatus, a position of the idle drive apparatus, positions of all of the item carrying apparatus, a road layout of the item storage space, etc. The above are merely examples, and the types of the dispatching requests and the picking resource status information required for the dispatching requests are not limited thereto, and may be other content according to actual requirements.

Based on the preset correspondence between a type of dispatching request and picking resource status information, a target picking resource status information may be determined in the following way: determining the type of the dispatching request, and determining the picking resource status information corresponding to the type according to the correspondence, the determined picking resource status information being the target picking resource status information.

S102: generating mirror-image information of the target picking resource status information.

The target picking resource status information indicates current status information of picking resources. If a status of the target picking resources changes, the change may be reflected in the target picking resource status information in real time. For example, the target picking resource status information includes an amount of power of the drive apparatus. As time goes by, the amount of power of the drive apparatus continuously decreases, and therefore the amount of power of the drive apparatus in the target picking resource status information continuously changes. For example, the target picking resource status information includes a busy/idle state of the drive apparatus. The drive apparatus may be idle when determining of the target picking resource status information, but may be then manually or automatically set to be busy immediately. Accordingly, the drive apparatus may immediately issue a modification instruction to the target picking resource status information to modify the information in the target picking resource status information to a busy state. The change of the target picking resource status information is not limited to the above two types, and may be other types.

In summary, because it takes a period of time to generate the dispatching task using the target picking resource status information, if the target picking resource status information changes during the period of time, an error may occur during the generation of the dispatching task. Therefore, after the target picking resource status information is determined, the target picking resource status information is duplicated to obtain mirror-image information of the target picking resource status information.

In some embodiments, the target picking resource status information is stored in a context container. The target picking resource status information in the context container may be duplicated to generate a context container mirror, and the duplicated target picking resource status information is stored in the context container mirror. The picking resource status information in the context container mirror image may be used to process the dispatching request in step S101 to generate a dispatching task. A status write process updates the picking resource status information in the context container without affecting the target picking resource status information in the context container mirror.

Different dispatching requests may require different picking resource status information. After a dispatching request is received, a corresponding context container mirror image may be generated for the dispatching request. In addition, the context container mirror image may also be referred to as a dispatching window.

S103: generating a dispatching task for item picking based on the mirror-image information of the target picking resource status information.

The mirror-image information of the target picking resource status information has been determined based on the dispatching request. Therefore, a dispatching task may be generated for the dispatching request using the mirror-image information. A dispatching task is related to a dispatching request. The content of the dispatching task is content of processing the dispatching request. The content of the dispatching task may be content generated based on the processing of the dispatching request, for example, including instructions for a number of picking devices to perform some actions, and/or other operations facilitating the picking devices to complete the actions.

For example, the dispatching request is to replenish a drive apparatus with energy. Thus, the dispatching task may be to control the drive apparatus to arrive at an energy replenishing apparatus along a route for charging. In another example, the dispatching request is to drive an item carrying apparatus to a position. Thus, the dispatching task may be to determine an idle drive apparatus for the carrying vehicle and control the drive apparatus to drive the item carrying apparatus to the position.

Dispatching tasks may be generated in different ways for different dispatching requests. A generation process of the dispatching task is described by taking the three above-described dispatching requests as examples.

For example, the dispatching request is to replenish the drive apparatus with energy, and the target picking resource status information includes: a position of the drive apparatus, positions of all energy replenishing apparatus, occupation states of all of the energy replenishing apparatus, a road layout of the item storage space, etc. During generation of the dispatching task, an unoccupied energy replenishing apparatus closest to the drive apparatus may be determined based on the position of the drive apparatus, the positions of all of the energy replenishing apparatus, and the occupation states of all of the energy replenishing apparatus, and a movement route for the drive apparatus to travel to the energy replenishing apparatus is generated based on the road layout of the item storage space.

In another example, the dispatching request is to drive the item carrying apparatus from a position to another, and the target picking resource status information includes: a position of the item carrying apparatus, positions of all drive apparatus, occupation of all of the drive apparatus, a road layout of item storage space, etc. During generation of the dispatching task, an idle drive apparatus closest to the item carrying apparatus is determined based on the position of the item carrying apparatus, the positions of all of the drive apparatus, and the occupation states of all of the drive apparatus, and a movement route for the drive apparatus to drive the item carrying apparatus from a position to another is generated based on the road layout of the item storage space.

In still another example, the dispatching request is to assign a task of driving the item carrying apparatus to an idle drive apparatus, and the target picking resource status information includes: picking task progresses of all item carrying apparatus, a position of the idle drive apparatus, positions of all of the item carrying apparatus, a road layout of the item storage space, etc. During generation of the dispatching task, an item carrying apparatus closest to an idle drive apparatus and having a picking task progress being complete is determined based on the picking task progresses of all of the item carrying apparatus, the positions of all of the item carrying apparatus, and the position of the idle drive apparatus, and a movement route for the idle drive apparatus to travel to the item carrying apparatus is generated based on the road layout of the item storage space.

The above manners of generating dispatching tasks are merely examples. Target picking resource status information and the manner of generating a dispatching task may vary with a dispatching request. In some embodiments, the dispatching request may be processed using processing modules such as a dispatching algorithm solver, an assignment algorithm solver, and a charge shift solver, etc.

After the dispatching task is generated, the target picking resource status information may be updated. For example, the dispatching task is to assign, to a drive apparatus, a task to drive an item carrying apparatus. The picking resource status information of the drive apparatus is changed from idle to busy, and the target picking resource status information includes a correspondence between the drive apparatus and the item carrying apparatus. Taking the target picking resource status information being in the context container as an example, updating the target picking resource status information means updating the target picking resource status information in the context container.

The dispatching task is generated based on the mirror image of the target picking resource status information, and the target picking resource status information may change during generation of the picking task. Therefore, in order to avoid an error during execution of the generated dispatching task, before the dispatching task is assigned, status information of picking resources associated with the dispatching task is checked to determine whether there is a conflict between the status information of the picking resources and the dispatching task. If there is a conflict, the dispatching task may be canceled. In some embodiments, an updated version of the target picking resource status information may be obtained. It may be then determined whether the dispatching task conflicts with the updated version of the target picking resource status information. If the dispatching task is determined to be in conflict with the updated version of the target picking resource status information, the dispatching task may be canceled. Otherwise, the dispatching task may be assigned.

For example, the dispatching task is to drive the item carrying apparatus from a position A to a position B through the drive apparatus 1. During generation of the dispatching task, the amount of power of the drive apparatus 1 associated with the dispatching task is greater than a preset threshold. However, the amount of power of the drive apparatus 1 is less than the preset threshold during the check performed before the dispatching task is assigned. In such a situation, the dispatching task may be canceled to avoid a dispatching error.

The conflict between the picking resource status information and the dispatching task may refer to a pre-determined conflict that may prevent a dispatching task from being completed in time. For example, the amount of power of the drive apparatus is less than the preset threshold, and it takes a long time to replenish the power. In another example, the drive apparatus is changed from an idle state to a busy state. Some conditions may not be preset as conflicts in this method. For example, the drive apparatus is located at a point A during calculation of the dispatching, but is located at a point B during assigning of the dispatching task. If the point A is not far away from the point B, or the drive apparatus is closer to a to-be-driven item carrying apparatus when located at the point B than the point A, the dispatching task may still be assigned, causing the drive apparatus located at the point B to perform the dispatching task. In another example, a position of an item carry apparatus to be driven by the drive apparatus changes from a point C to a point D, but the point C is not far from the point D, or the item carrying apparatus is closer to the drive apparatus when located at the point D than the point C. Therefore, the dispatching task may still be assigned, causing the drive apparatus to drive the item carrying apparatus located at the point D.

Accordingly, the specification provides the method for processing an item-picking dispatching request. In the method, after the dispatching request is received, the picking resource status information corresponding to the dispatching request is determined and a mirror image of the picking resource status information is generated, and then the dispatching task is generated using the mirror image of the picking resource status information. In this way, even if the picking resource status information is updated, the mirror-image information of the picking resource status information is not affected, thereby avoiding an impact of the updated picking resource status information on the dispatching request.

Figure 2:
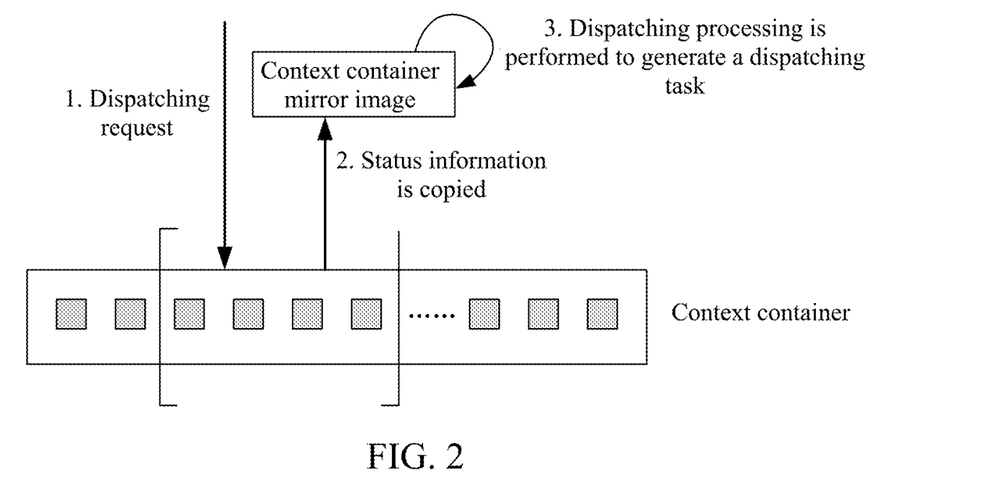
FIG. 2 is another flowchart of a method for processing an item-picking dispatching request, according to some embodiments of the specification.

In order to facilitate understanding of the above processing, description is given with reference to the context container shown in FIG. 2. FIG. 2 is a schematic diagram of processing of an item-picking dispatching request, according to some embodiments of the specification. As shown in FIG. 2, boxes in a context container represent picking resource status information. After the dispatching request is received, picking resource status information required for the dispatching request is selected from the context container, and the selected picking resource status information is copied to the context container mirror. The dispatching task is generated using the picking resource status information in the context container mirror.

Figure 3:
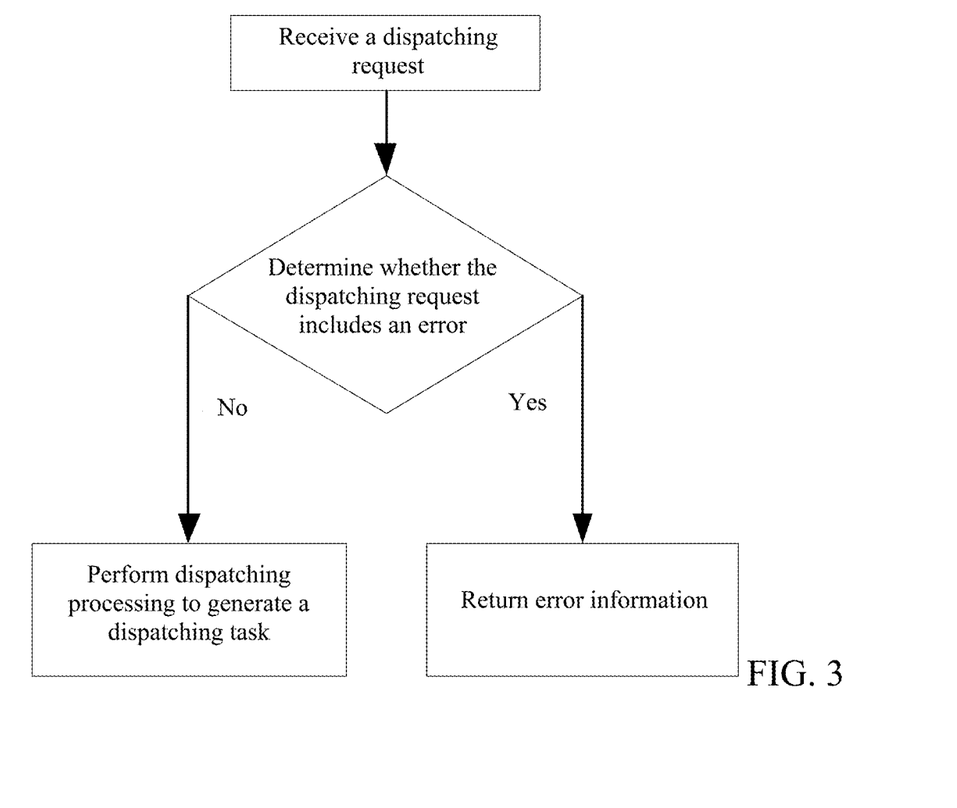
FIG. 3 is still another flowchart of a method for processing an item-picking dispatching request, according to some embodiments of the specification.

In some embodiments, as shown in FIG. 3, after the dispatching request with respect to item picking is received, and before the target picking resource status information is determined in step S101, the method may further include: a step of checking the dispatching request.

In some embodiments, it is determined whether the dispatching request with respect to the item picking has an error. If the dispatching request has an error, corresponding error information is generated according to a type of the error, and the error information is returned. If the dispatching request has no error, the step of determining the target picking resource status information corresponding to the dispatching request is performed.

The received dispatching request may have an error, and different dispatching requests may include errors as a result of different reasons. For example, the dispatching request is sent by the drive apparatus, and a dispatching content is to request for executing a driving task. The energy of the drive apparatus may be at a lower energy limit, and therefore cannot enter a working state. In another example, if a picking person in a picking area does not completely pick items in a picking area and send to the item carrying apparatus, but presses a finish button on the item carrying apparatus, the item carrying apparatus sends a dispatching request, and the content of the dispatching request is to drive the item carrying apparatus to a position of a next picking area. Due to the erroneous operation of the picking person, the dispatching request is erroneous. In another example, the item carrying apparatus sends a dispatching request. The content of the dispatching request is to drive the item carrying apparatus to a position of a picking area to perform a picking task, and the picking task is to load items picked from the picking area. However, the item carrying apparatus is not bound or assigned with the picking task.

In order to ensure the accuracy of dispatching tasks, the dispatching requests may be checked before the dispatching tasks are generated. To-be-checked content varies for different dispatching requests. To-be-checked content corresponding to a dispatching request may be preset. After the dispatching request is received, the to-be-checked content corresponding to the dispatching request may be determined according to the correspondence. Further, the dispatching request is checked according to the to-be-checked content. In some embodiments, it may be determined whether the dispatching request conflicts with picking resource status information related to the dispatching request. For example, the dispatching request is a request for the drive apparatus to perform a driving task. Thus, it may be determined whether the drive apparatus is idle and whether the energy is below the lower energy limit. In another example, the dispatching request is to move the item carrying apparatus from a position of a picking area to another to perform a picking task. Thus, it may be determined whether the item carrying apparatus is bound with a picking task and whether the item carrying apparatus completes a picking task of the picking area. The above-described dispatching requests and the to-be-checked content corresponding to the dispatching requests are some examples. Other examples of the dispatching request and to-be-checked content may also be used.

As shown in FIG. 3, if it is determined that the dispatching request has an error, the error information is returned to the apparatus that sends the dispatching request. Further, the error information may also be reported to the dispatching system to remind system personnel of the error. If no error is found in the dispatching request, the context container is determined and dispatching processing is performed according to the steps S102 and S103 shown in FIG. 1 to generate the dispatching task.

The dispatching request may be processed by a dispatching process. In addition to the dispatching process, the dispatching system may also include a write process. The write process is mainly configured to update the picking resource status information. For example, the write process writes the picking resource status information to the context container. "Writing" means an update action, including actions such as adding, deleting, and modifying, etc. In some embodiments, the write process may write the received picking resource status information into the context container, or check the received picking resource status information to determine whether the picking resource status information includes erroneous picking resource status information. If the picking resource status information does not include erroneous picking resource status information, the picking resource status information is written into the context container.

Figure 4:
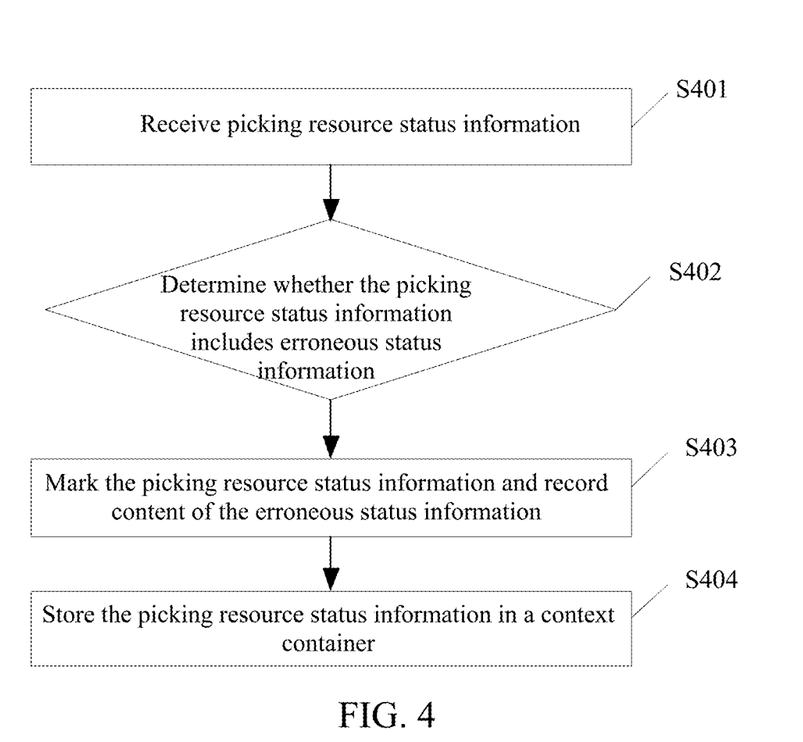
FIG. 4 is a flowchart of writing status information to a context container, according to some embodiments of the specification.

A process of writing the picking resource status information into the context container shown in FIG. 4 includes steps S401 to S404.

S401: receiving picking resource status information.

The picking resource status information may include, but is not limited to, a layout map of item storage space, picking resource status information of an item carrying apparatus, picking resource status information of a drive apparatus, and status information of a picking task bound to the drive apparatus or the item carrying apparatus. The status information of a picking task may include, but is not limited to, the picking areas from which items included in the picking task come, respectively. The picking resource status information may be sent by a picking device or other devices. For example, the layout map of the item storage space may be sent by a map management module in the dispatching system. The picking resource status information of the item carrying apparatus may be sent by the item carrying apparatus. The picking resource status information of the drive apparatus may be sent by the drive apparatus. The status information of the picking task bound to the drive apparatus or the item carrying apparatus may be sent by a module in the dispatching system.

S402: determining whether the picking resource status information includes erroneous status information.

Erroneous content may vary with the type of the status information. For status information that is required to include two information entries, it is determined whether the status information includes two information entries that have a correspondence. In some embodiments, if it is determined that the status information does not include the two information entries that have the correspondence, for example, only includes one of the two information entries, then it may be determined that the status information includes an error.

For example, if the picking resource status information of the item carrying apparatus indicates a working state, it means that the item carrying apparatus is not idle and has a corresponding item picking task. If the picking task corresponding to the item carrying apparatus is not detected in the picking resource status information, the picking resource status information is considered to be erroneous. In another example, if the picking resource status information of the drive apparatus indicates a working state, it means that the drive apparatus is occupied by an item carrying apparatus. If the item carrying apparatus corresponding to the drive apparatus is not detected in the picking resource status information, the picking resource status information is considered to be erroneous. The above to-be-checked content of the picking resource status information and the picking resource status information are merely examples, and the picking resource status information and the picking resource status information may include other to-be-checked content.

An error with respect to the two information entries corresponding to each other may be that there is only one information entry, for example, there is only the item carrying apparatus but without a corresponding drive apparatus or vice versa. Alternatively, there is a correspondence between two or more information entries. For example, a picking area in the layout map corresponds to a plurality of item carrying apparatus. However, it may be understood that a position cannot be occupied by a plurality of item carrying apparatus. Therefore, the picking resource status information is erroneous.

S403: if the picking resource status information includes the erroneous status information, marking the picking resource status information and recording content of the erroneous status information.

If the picking resource status information is stored in the context container, the picking resource status information marked as erroneous may also be stored in the context container. Because the picking resource status information is marked as erroneous, when using picking resource status information to perform dispatching, it may be determined first whether picking resource status information has an error mark, and picking resource status information without an error mark is selected. Alternatively, the picking resource status information marked as erroneous is stored in other containers, such as an error log file, etc.

S404: if the picking resource status information includes no erroneous status information, storing the picking resource status information in the content container.

The process of storing the picking resource status information is provided above. The picking resource status information may be checked before storage, and the erroneous picking resource status information may be found and isolated, so that correctness of the picking resource status information is ensured, thereby ensuring accuracy of the dispatching tasks generated using the picking resource status information.

That the picking resource status information is stored in the context container is taken as an example. The write process can write the picking resource status information to the context container, and the dispatching process can extract the picking resource status information from the context container to generate a dispatching task. Error check may be performed before writing and extraction to ensure accuracy of a dispatching process.

In some embodiments, a plurality of drive apparatus may be deployed in the item storage space, but data communication formats used by the drive apparatus may vary. When the dispatching system communicates with each drive apparatus, for example, sends the picking resource status information, returns an error message, and sends a dispatching request, etc., the communication format may be converted. The communication format may also be referred to as a communication protocol.

For example, different types of drive apparatus are produced by different manufacturers, and different manufacturers use different communication formats. Working principles of different types of drive apparatus may also vary. For example, some types of drive apparatus drive a picking vehicle through dragging, some types of drive apparatus drive a picking vehicle through traction, and some types of drive apparatus drives a picking vehicle through pushing.

Figure 5:
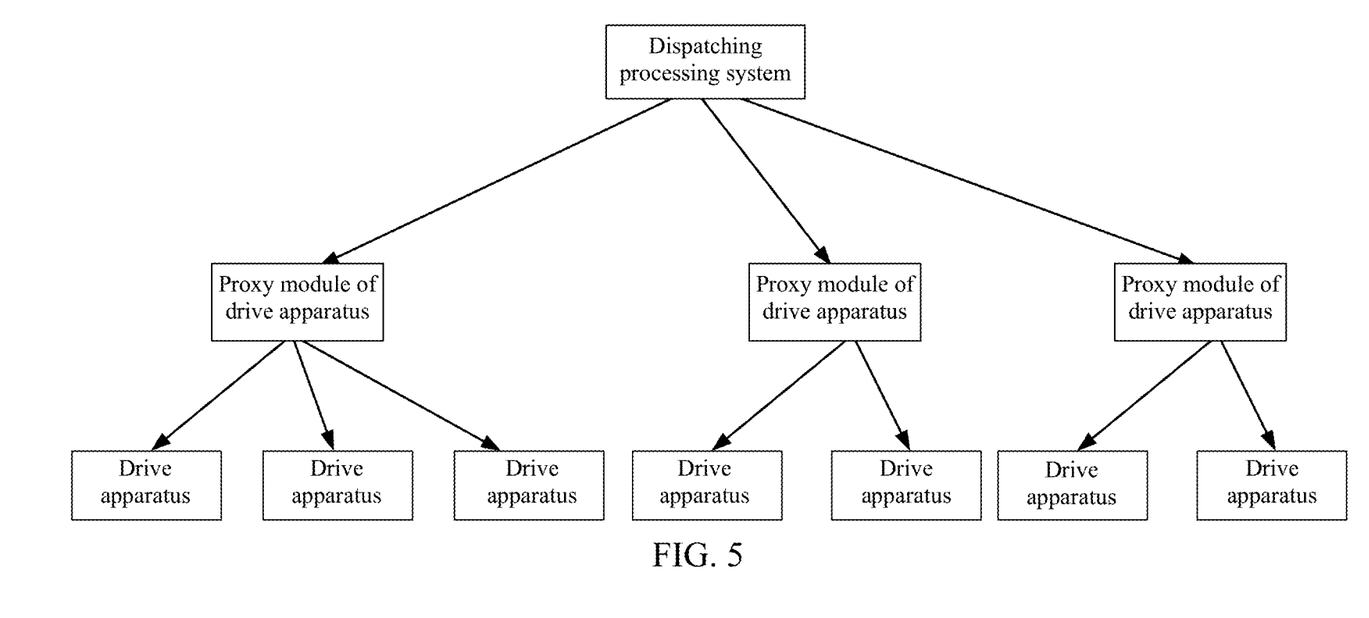
FIG. 5 is a schematic structural diagram of a connection between a dispatching system and a drive apparatus through a proxy module, according to some embodiments of the specification.

Therefore, as shown in FIG. 5, corresponding proxy modules may be disposed for different types of drive apparatus. The proxy module converts the communication format between the drive apparatus and the dispatching system, so that the communication format can be converted into a communication format that may be recognized by the dispatching system and the drive apparatus. The dispatching system may be a processing device of the item-picking dispatching request, or a processing device of the item-picking dispatching request is a device in the dispatching system.

Based on the processing performed by the proxy module, the picking resource status information includes picking resource status information sent by the drive apparatus. The picking resource status information sent by the drive apparatus is converted into picking resource status information of a uniform format through format conversion by the proxy module of the drive apparatus. The dispatching request includes a dispatching request sent by the drive apparatus. The dispatching request sent by the drive apparatus is converted into a dispatching request of a uniform format through format conversion by the proxy module of the drive apparatus.

In addition, in the dispatching system, a visual control interface may be further disposed to display an operating state of the drive apparatus in real time, and a dispatching instruction submitted manually may also be received to dispatch the drive apparatus to drive the item carrying apparatus or replenish itself with energy.

Figure 6:
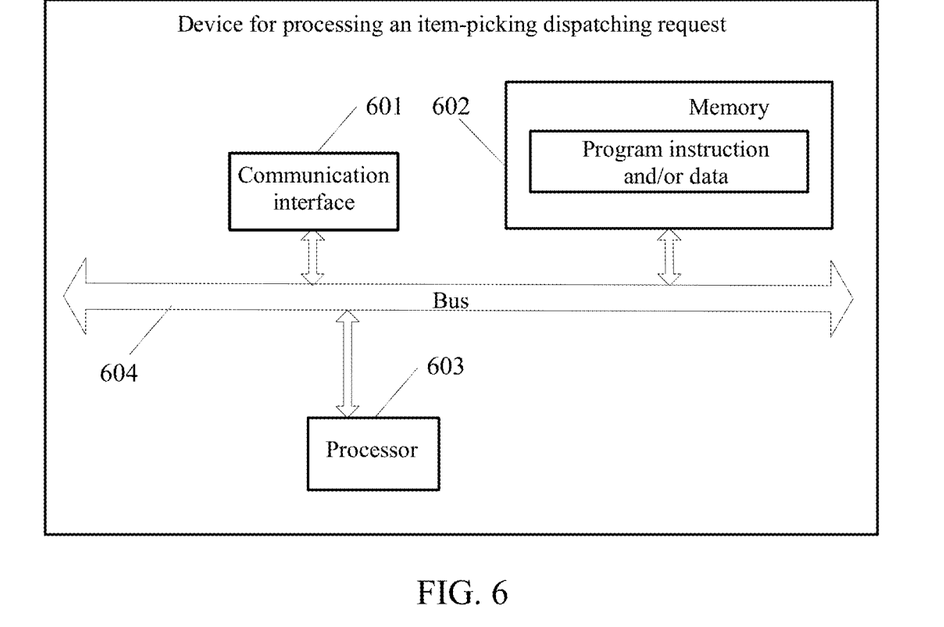
FIG. 6 is a schematic structural diagram of a device for processing an item-picking dispatching request, according to some embodiments of the specification.

The specification further provides a device for processing an item-picking dispatching request, to perform the method for processing the item-picking dispatching request. Referring to FIG. 6, FIG. 6 is a schematic structural diagram of a device for processing an item-picking dispatching request, according to some embodiments of the specification. The device includes: a communication interface 601, a memory 602, a processor 603, and a bus 604.

The communication interface 601 is configured to receive a dispatching request with respect to item picking.

The memory 602 is configured to store a program instruction and/or data.

The processor 603 is configured to read the instruction and/or the data stored in the memory 502 to perform the following operations: determining target picking resource status information corresponding to the dispatching request; generating mirror-image information of the target picking resource status information; and generating a dispatching task for item picking based on the mirror-image information of the target picking resource status information.

The bus 604 is configured to couple various hardware components for the item-picking dispatching request.

In some embodiments, that the processor 603 is configured to determine target picking resource status information corresponding to the dispatching request includes: the processor 603 is configured to: determine a type of the dispatching request; and determine the target picking resource status information as picking resource status information corresponding to the type according to a preset correspondence between the type of the dispatching request and the picking resource status information.

In some embodiments, after the dispatching request with respect to item picking is received, and before the target picking resource status information corresponding to the dispatching request is determined, the processor 603 is further configured to: determine whether the dispatching request with respect to the item picking has an error; if the dispatching request has an error, generate corresponding error information according to a type of the error, and return the error information; and if the dispatching request has no error, perform the step of determining the target picking resource status information corresponding to the dispatching request.

In some embodiments, the processor 603 is further configured to: after the picking resource status information is received, determine whether the picking resource status information includes erroneous status information; and if the picking resource status information includes no erroneous status information, store the picking resource status information.

In some embodiments, the processor 603 is further configured to: if the picking resource status information includes the erroneous status information, mark the erroneous picking resource status information and record content of the erroneous status information.

In some embodiments, that the processor 603 is configured to determine whether the picking resource status information includes the erroneous status information includes: the processor 603 is configured to determine whether the picking resource status information includes two information entries with a correspondence.

In some embodiments, the picking resource status information includes status information sent by a drive apparatus. The status information sent by the drive apparatus is converted into status information of a uniform format through format conversion by a proxy module of the drive apparatus. The dispatching request includes a dispatching request sent by the drive apparatus. The dispatching request sent by the drive apparatus is converted into a dispatching request of a uniform format through format conversion by the proxy module of the drive apparatus.

In some embodiments, the processor 603 is further configured to update the target picking resource status information based on the dispatching task.

Figure 7:
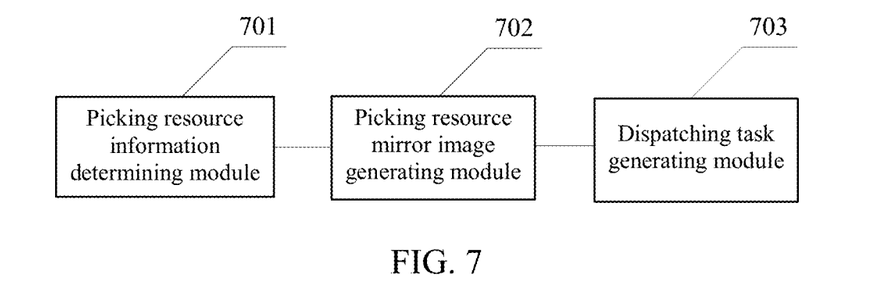
FIG. 7 is a schematic structural diagram of an apparatus for processing an item-picking dispatching request, according to some embodiments of the specification.

Referring to FIG. 7, FIG. 7 is a schematic structural diagram of an apparatus for processing an item-picking dispatching request, according to some embodiments of the specification. The apparatus includes: a picking resource information determining module 701, a picking resource mirror image generating module 702, and a dispatching task generating module 703.

The picking resource information determining module 701 is configured to: after receiving a dispatching request with respect to item picking, determine target picking resource status information corresponding to the dispatching request.

The picking resource mirror image generating module 702 is configured to generate mirror-image information of the target picking resource status information.

The dispatching task generating module 703 is configured to generate a dispatching task for item picking based on the mirror-image information of the target picking resource status information.

Implementation of functions of the various modules in the apparatus for processing the item-picking dispatching request may follow the steps in the above method embodiments, and details are not described herein.

The embodiments of the specification are all described in a progressive manner, each embodiment focuses on a difference from other embodiments, and for same or similar parts in the embodiments, mutual reference may be made to these embodiments.

The relational terms herein such as first and second are used only to differentiate an entity or operation from another entity or operation, and do not require or imply any actual relationship or sequence between these entities or operations. Moreover, the terms "include," "comprise," and any variants thereof are intended to cover a non-exclusive inclusion. Therefore, in the context of a process, a method, an object, or an apparatus that includes a series of elements, the process, method, object, or apparatus not only includes such elements, but also includes other elements not specified expressly, or may include inherent elements of the process, method, object, or apparatus. Unless otherwise specified, an element limited by "include a/an . . . " does not exclude other same elements existing in the process, method, object, or device that includes the elements.

The foregoing description of the disclosed embodiments enables a person skilled in the art to implement or use the application. Various modifications to these embodiments are obvious to a person skilled in the art, and the general principles defined in this specification may be implemented in other embodiments without departing from the spirit and scope of the application. Therefore, the application is not limited to these embodiments illustrated herein, but conforms to the broadest scope consistent with the principles and novel features disclosed herein.

What is claimed is:

1. A method for processing an item-picking dispatching request, comprising:
   receiving, by a dispatching system from a picking device, a communication containing picking resource status information;
   writing, by the dispatching system, the received picking resource status information to stored picking resource status information;
   receiving, by a dispatching system, a dispatching request with respect to item picking;
   determining, by the dispatching system, a type of the dispatching request;
   determining, by the dispatching system, in the stored picking resource status information, target picking resource status information corresponding to the type of the dispatching request according to a preset correspondence between types of dispatching requests and picking resource status information, wherein the stored picking resource status information is updated in real time;
   generating, by the dispatching system, mirror-image information of the target picking resource status information;
   generating, by the dispatching system, a dispatching task for item picking based on the mirror-image information of the target picking resource status information;
   updating, by the dispatching system, the stored pick resource status information without affecting the mirror-image information;
   determining, by the dispatching system, whether the dispatching task conflicts with the updated target picking resource status information;
   in response to determining that the dispatching task conflicts with the updated target picking resource status information, canceling the dispatching task; and
   in response to determining that the dispatching task does not conflict with the updated target picking resource status information, sending the dispatching task to the picking device, causing the picking device to perform one or more item picking actions.

2. The method of claim 1, wherein before determining, in the stored picking resource status information, target picking resource status information corresponding to the type of the dispatching request according to a preset correspondence between types of dispatching requests and picking resource status information, the method further comprises:
   determining whether the dispatching request has an error;
   in response to determining that the dispatching request has an error, generating error information according to a type of the error, and returning the error information; and
   in response to determining that the dispatching request has no error, proceeding to the step of determining, in the stored picking resource status information, target picking resource status information corresponding to the type of the dispatching request according to a preset correspondence between types of dispatching requests and picking resource status information.

3. The method of claim 2, wherein determining whether the dispatching request with respect to the item picking has an error comprises:
   determining whether the dispatching request conflicts with the target picking resource status information.

4. The method of claim 1, further comprising:
   determining whether the received picking resource status information comprises erroneous status information.

5. The method of claim 4, further comprising:
   in response to determining the received picking resource status information comprises erroneous status information, marking the erroneous picking resource status information and recording content of the erroneous status information.

6. The method of claim 4, wherein determining whether the received picking resource status information comprises erroneous status information comprises:
   determining whether the received picking resource status information comprises two information entries with a correspondence; and
   in response to determining that the received picking resource status information does not comprise the two information entries with the correspondence, determining the received picking resource status information comprises erroneous status information.

7. The method of claim 1, wherein:
   the received picking resource status information comprises status information that is of a uniform format; and
   the dispatching request is of the uniform format.

8. The method of claim 1, further comprising:
   updating the target picking resource status information based on the generated dispatching task.

9. A device for processing an item-picking dispatching request, comprising:
   a communication interface configured to receive a dispatching request with respect to item picking; and
   one or more processors and one or more non-transitory computer-readable memories coupled to the one or more processors and configured with instructions executable by the one or more processors to perform operations comprising:
   receiving, from a picking device, a communication containing picking resource status information;
   writing the received picking resource status information to stored picking resource status information;
   receiving a dispatching request with respect to item picking;
   determining a type of the dispatching request;
   determining, in the stored picking resource status information, target picking resource status information corresponding to the type of the dispatching request according to a preset correspondence between types of dispatching requests and picking resource status information, wherein the stored picking resource status information is updated in real time;

generating mirror-image information of the target picking resource status information; and generating a dispatching task for item picking based on the mirror-image information of the target picking resource status information;

updating the stored pick resource status information without affecting the mirror-image information;

determining whether the dispatching task conflicts with the updated target picking resource status information;

in response to determining that the dispatching task conflicts with the updated target picking resource status information, canceling the dispatching task; and in response to determining that the dispatching task does not conflict with the updated target picking resource status information, sending the dispatching task to the picking device, causing the picking device to perform one or more item picking actions.

10. The device of claim 9, wherein before determining, in the stored picking resource status information, target picking resource status information corresponding to the type of the dispatching request according to a preset correspondence between types of dispatching requests and picking resource status information, the operations further comprise:

determining whether the dispatching request has an error;

in response to determining that the dispatching request has an error, generating error information according to a type of the error, and returning the error information; and in response to determining that the dispatching request has no error, proceeding to the step of determining, in the stored picking resource status information, target picking resource status information corresponding to the type of the dispatching request according to a preset correspondence between types of dispatching requests and picking resource status information.

11. The device of claim 10, wherein determining whether the dispatching request with respect to the item picking has an error comprises:

determining whether the dispatching request conflicts with the target picking resource status information.

12. The device of claim 9, wherein the operations further comprise:

determining whether the received picking resource status information comprises erroneous status information.

13. The device of claim 12, wherein the operations further comprise:

in response to determining the received picking resource status information comprises erroneous status information, marking the erroneous picking resource status information and recording content of the erroneous status information.

14. The device of claim 12, wherein the determining whether the received picking resource status information comprises erroneous status information comprises:

determining whether the received picking resource status information comprises two information entries with a correspondence; and in response to determining that the received picking resource status information does not comprise the two information entries with the correspondence, determining the received picking resource status information comprises erroneous status information.

15. The device of claim 9, wherein the received picking resource status information comprises status information that is of a uniform format; and the dispatching request is of the uniform format.

16. The device of claim 9, wherein the operations further comprise:

updating the target picking resource status information based on the generated dispatching task.

17. An apparatus for processing an item-picking dispatching request, comprising: one or more processors and one or more non-transitory computer-readable memories coupled to the one or more processors and configured with instructions executable by the one or more processors to cause the apparatus to perform operations comprising:

receiving, from a picking device, a communication containing picking resource status information;

writing the received picking resource status information to stored picking resource status information;

receiving a dispatching request with respect to item picking;

determining a type of the dispatching request;

determining, in the stored picking resource status information, target picking resource status information corresponding to the type of the dispatching request according to a preset correspondence between types of dispatching requests and picking resource status information, wherein the stored picking resource status information is updated in real time;

generating mirror-image information of the target picking resource status information; and generating a dispatching task for item picking based on the mirror-image information of the target picking resource status information;

updating the stored pick resource status information without affecting the mirror-image information;

determining whether the dispatching task conflicts with the updated target picking resource status information;

in response to determining that the dispatching task conflicts with the updated target picking resource status information, canceling the dispatching task; and in response to determining that the dispatching task does not conflict with the updated target picking resource status information, sending the dispatching task to the picking device, causing the picking device to perform one or more item picking actions.

* * * * *